United States Patent
Seo et al.

(10) Patent No.: US 10,468,190 B2
(45) Date of Patent: Nov. 5, 2019

(54) CAPACITOR COMPONENT

(71) Applicant: SAMSUNG ELECTRO-MECHANICS CO., LTD., Suwon-si, Gyeonggi-do (KR)

(72) Inventors: Yong Won Seo, Suwon-si (KR); Jin Kyung Joo, Suwon-si (KR); Taek Jung Lee, Suwon-si (KR); Jin Woo Chun, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/714,754

(22) Filed: Sep. 25, 2017

(65) Prior Publication Data

US 2018/0233287 A1    Aug. 16, 2018

(30) Foreign Application Priority Data

Feb. 10, 2017    (KR) .................. 10-2017-0018727

(51) Int. Cl.
| | |
|---|---|
| *H01G 4/232* | (2006.01) |
| *H01G 4/30* | (2006.01) |
| *H01G 4/06* | (2006.01) |
| *H01G 4/008* | (2006.01) |
| *H01G 4/012* | (2006.01) |
| *H01G 4/12* | (2006.01) |

(52) U.S. Cl.
CPC .............. *H01G 4/30* (2013.01); *H01G 4/008* (2013.01); *H01G 4/012* (2013.01); *H01G 4/06* (2013.01); *H01G 4/12* (2013.01); *H01G 4/232* (2013.01)

(58) Field of Classification Search
CPC .......... H01G 4/30; H01G 4/236; H01G 4/228; H01G 4/232
See application file for complete search history.

(56) References Cited

U.S. PATENT DOCUMENTS

| | | |
|---|---|---|
| 7,035,079 B1 | 4/2006 | Park et al. |
| 8,343,361 B2 | 1/2013 | Takeshima et al. |
| 8,754,335 B2 | 6/2014 | Sato et al. |
| 9,258,896 B2 | 2/2016 | Park et al. |
| 2010/0252527 A1* | 10/2010 | Takeshima ............. H01G 4/228 216/13 |

(Continued)

FOREIGN PATENT DOCUMENTS

| | | |
|---|---|---|
| CN | 1787136 A | 6/2006 |
| CN | 101896985 A | 11/2010 |

(Continued)

OTHER PUBLICATIONS

Office Action issued in Chinese Application No. 201711191161.3 dated Jul. 24, 2019, with English translation.

*Primary Examiner* — Eric W Thomas
(74) *Attorney, Agent, or Firm* — Morgan, Lewis & Bockius LLP

(57) ABSTRACT

A capacitor component includes a body with a plurality of first and second internal electrodes alternately stacked with dielectric layers interposed therebetween. First and second connection electrodes extend in a thickness direction of the body and are respectively connected to the first and second internal electrodes. First and second lower electrodes are on a lower surface of the body and are respectively connected to the first and second connection electrodes.

20 Claims, 4 Drawing Sheets

(56) References Cited

U.S. PATENT DOCUMENTS

| | | | | |
|---|---|---|---|---|
| 2011/0002082 A1* | 1/2011 | Bultitude | ............... | H01G 4/005 361/306.3 |
| 2012/0018204 A1* | 1/2012 | Sato | ...................... | H01G 4/232 174/260 |
| 2012/0018205 A1* | 1/2012 | Sato | ........................ | H01C 1/14 174/260 |
| 2014/0185184 A1* | 7/2014 | Ahn | ........................ | H01G 4/30 361/301.4 |
| 2015/0124371 A1* | 5/2015 | Park | ...................... | H01G 4/012 361/301.4 |
| 2017/0236634 A1* | 8/2017 | Block | ................. | H01F 27/2804 336/200 |
| 2017/0332491 A1* | 11/2017 | Miyauchi | ............... | H05K 1/162 |

FOREIGN PATENT DOCUMENTS

| | | |
|---|---|---|
| CN | 102347315 A | 2/2012 |
| CN | 102473522 A | 5/2012 |
| CN | 104637680 A | 5/2015 |
| KR | 10-2001-0036982 A | 5/2001 |
| KR | 10-2008-0111952 A | 12/2008 |
| WO | 2011/002982 A2 | 1/2011 |

\* cited by examiner

CAPACITOR COMPONENT

CROSS-REFERENCE TO RELATED APPLICATION(S)

This application claims benefit of priority to Korean Patent Application No. 10-2017-0018727 filed on Feb. 10, 2017 in the Korean Intellectual Property Office, the disclosure of which is incorporated herein by reference in its entirety.

BACKGROUND

1. Field

The present disclosure relates to a capacitor component.

2. Description of Related Art

A multilayer ceramic capacitor (MLCC) is a chip-type condenser mounted on printed circuit boards of several electronic products, such as liquid crystal displays (LCD), plasma display panels (PDP), or other displays, computers, smartphones and other cellular phones, and the like. An MLCC serves to charge or discharge electricity. An MLCC may be used as a component of various electronic apparatuses since it is relatively small, implements high capacitance, and is easily mounted.

Recently, an MLCC having high capacitance and high reliability has been developed. To obtain a capacitor with high capacitance, the dielectric constant of the material constituting the capacitor body can be increased, or the number of dielectric layers and internal electrodes can be increased by reducing thicknesses of the dielectric layers and the internal electrodes.

However, it is not easy to develop a composition of a material having a high dielectric constant, and there is a limitation to reducing the thicknesses of the dielectric layers using current methods. As such, there is a limitation in increasing capacitance of the product by such methods. Therefore, research into a method of increasing an overlapping area of internal electrodes having different polarities in accordance with a trend for miniaturization of the capacitor and a method of increasing capacitance of the capacitor has been demanded. In addition, an attempt to reduce the mounting area and the mounted height of the capacitor in accordance with an increase in amounted density of the board has been conducted.

As a part of such research, a capacitor having a structure in which internal electrodes are connected to each other by through-holes has been developed. In this capacitor, a current flows through the through-holes connecting the internal electrodes to each other, unlike a general capacitor.

In such a structure, equivalent series inductance (ESL) and equivalent series resistance (ESR) characteristic values of the capacitor may be changed depending on the structures of the through-holes.

It is advantageous that a distance between the through-holes is small in order to obtain low ESL characteristics. But when the distance between the through-holes is excessively small, a defect such as a short-circuit may occur due to contact between the through-holes after plating is performed.

Products with a small size and a thin film form have been demanded, and capacitors having a low ESL characteristic value depending on high frequency characteristics have been demanded. Therefore, research into capacitors satisfying these demands has been required.

SUMMARY

An aspect of the present disclosure may provide a capacitor component with improved equivalent series inductance (ESL) and equivalent series resistance (ESR) values.

According to an aspect of the present disclosure, a capacitor component may include a body including a plurality of first and second internal electrodes alternately stacked in a thickness direction with dielectric layers interposed therebetween. First and second connection electrodes may extend in the thickness direction and be respectively connected to the first and second internal electrodes. First and second lower electrodes may be on a lower surface of the body in the thickness direction and respectively connected to the first and second connection electrodes. The first and second lower electrodes may respectively include first and second electrode layers respectively connected to the first and second connection electrodes and first and second plating layers respectively covering portions of the first and second electrode layers. The electrode layers may each include a first region covered by the plating layer and a second region connected to the connection electrode and extended from the first region. An insulating layer may be between the first and second plating layers and may cover the respective second regions of the first and second electrode layers and the first and second connection electrodes.

According to another aspect of the present disclosure, a capacitor component may include a body including a plurality of first and second internal electrodes alternately stacked in a thickness direction with dielectric layers interposed therebetween. First and second connection electrodes may extend in the thickness direction and be respectively connected to the first and second internal electrodes. First and second lower electrodes may be on a lower surface of the body in the thickness direction and respectively connected to the first and second connection electrodes. There may be one or more first connection electrodes and one or more second connection electrodes. All of the first and second connection electrodes may be in a central portion of the body, when the body is trisected in a length direction, and spaced apart from each other by a predetermined distance.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

Figure 1:
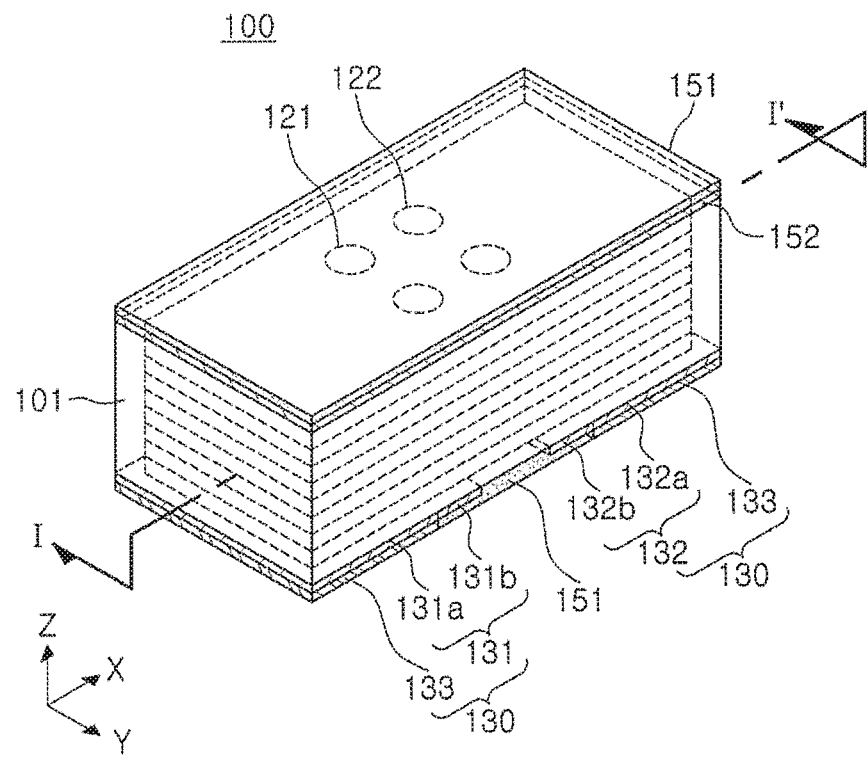
FIG. 1 is a schematic perspective view illustrating a capacitor component according to an exemplary embodiment in the present disclosure.
Figure 2:
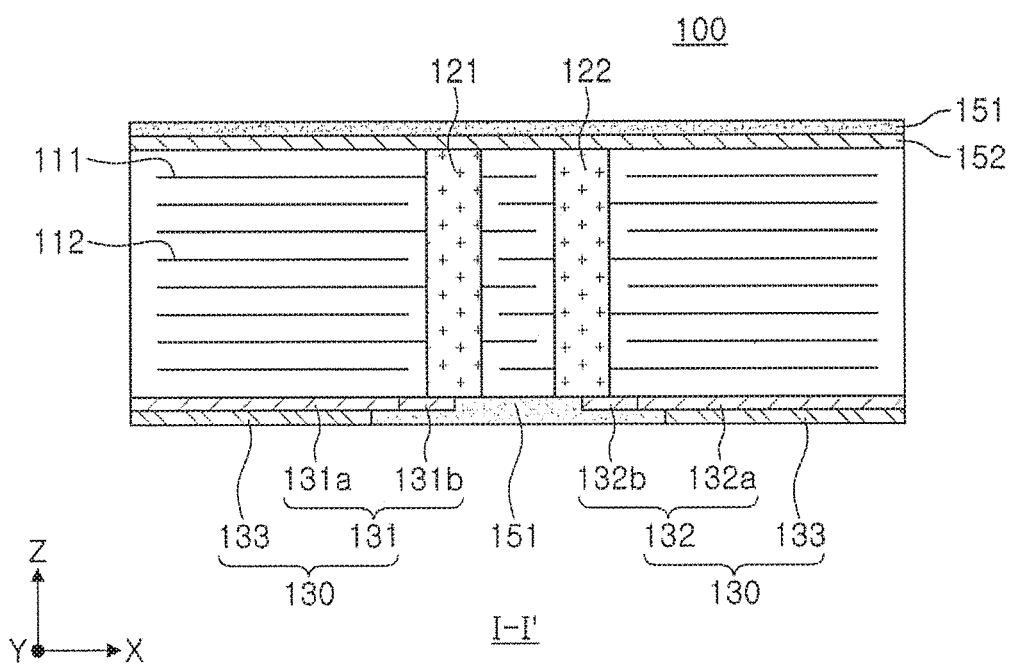
FIG. 2 is a cross-sectional view illustrating the capacitor component of FIG. 1 along the line I-I'.
Figure 3:
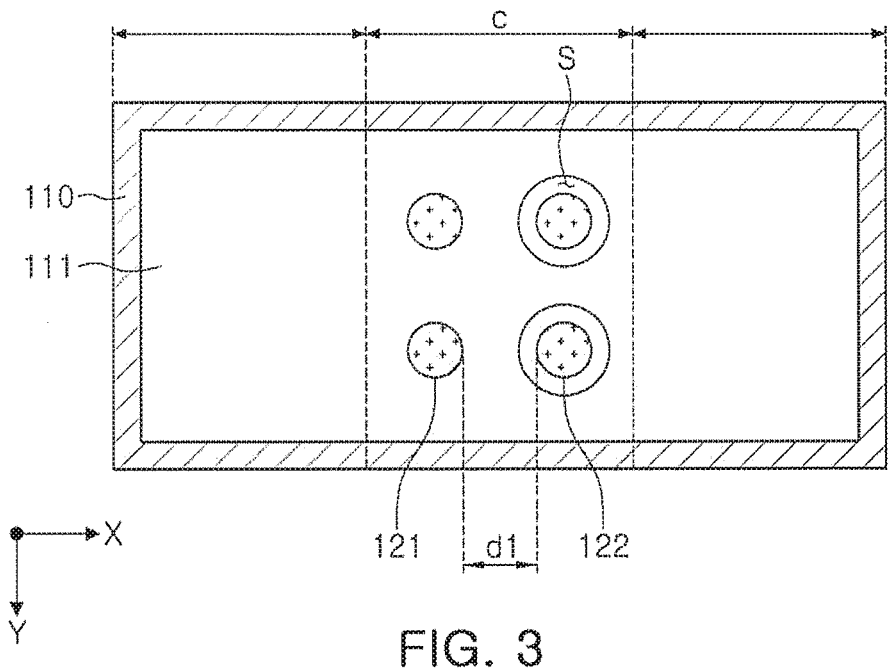
FIG. 3 is a top plan view illustrating forms of internal electrodes and connection electrodes in the capacitor component of FIG. 1.

FIG. 1 is a schematic perspective view illustrating a capacitor component according to an exemplary embodiment in the present disclosure. FIG. 2 is a cross-sectional view illustrating the capacitor component of FIG. 1 along the line I-I'. FIG. 3 is a top plan view illustrating forms of internal electrodes and connection electrodes in the capacitor component of FIG. 1.

Referring to FIGS. 1 through 3, a capacitor component 100 according to an exemplary embodiment in the present disclosure may include a body 101 including a plurality of dielectric layers 110 and first and second internal electrodes 111 and 112 alternately disposed with respective dielectric layers 110 interposed therebetween. First and second connection electrodes 121 and 122 may extend in a thickness direction of the body 101 and connect to the first and second internal electrodes 111 and 112, respectively. Lower electrodes 130 may be disposed on a lower surface of the body 110 and connect to the first and second connection electrodes 121 and 122, respectively.

In the present exemplary embodiment, a plurality of internal electrodes 111 and 112 will be referred to as first internal electrodes 111 and second internal electrodes 112. Connection electrodes connected to the first internal electrodes 111, of the connection electrodes 121 and 122, will be referred to as first connection electrodes 121. Connection electrodes connected to the second internal electrodes 112, of the connection electrodes 121 and 122, will be referred to as second connection electrodes 122.

The body 101 may be formed by stacking a plurality of dielectric layers, and the material of the dielectric layers may be a ceramic, or the like. For example, the body 101 may be formed by sintering ceramic green sheets including barium titanate ($BaTiO_3$) based ceramic powders, and the like. The barium titanate ($BaTiO_3$) based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), or the like, is partially dissolved in $BaTiO_3$. However, the barium titanate ($BaTiO_3$) based ceramic powder is not limited thereto.

The first and second internal electrodes 111 and 112 may have different polarities, may be alternately stacked, and may be formed by a method of printing a conductive paste on the ceramic green sheets, or the like. The first and second internal electrodes 111 and 112 may be formed of a material such as nickel (Ni), copper (Cu), palladium (Pd), or alloys thereof. The method of printing the conductive paste may be a screen printing method, a gravure printing method, or the like, but is not limited thereto.

The first and second connection electrodes 121 and 122 may extend in the thickness direction (the Z-axis direction in FIG. 2) of the body 101, may be connected to the first and second internal electrodes 111 and 112, respectively, and may penetrate through the body 101 as illustrated in FIG. 2. Such through-hole type connection electrodes 121 and 122 may be provided in a form in which they penetrate through the first and second internal electrodes that are not connected to the connection electrode 121 and 122. In other words, as illustrated in FIG. 3, the second connection electrodes 122 may have a form in which they are not connected to the first internal electrodes 111, but penetrate through the first internal electrodes 111 with insulating spaces S between the second connection electrodes 122 and the first internal electrodes 111. Likewise, the first connection electrodes 121 are not connected to the second internal electrodes 122, but penetrate through the second internal electrodes 122.

The first and second connection electrodes 121 and 122 may be formed by forming holes in the body 101 and the first and second internal electrodes 111 and 121 and then filling a conductive material in the holes. Fill the holes with conductive material may be carried out by a method of applying a conductive paste, a plating method, or the like. The holes of the body 101 may be formed by a laser method, punching, or the like, in the ceramic green sheets, or may be obtained by drilling holes in a laminate after being sintered.

In the capacitor component 100 according to the exemplary embodiment in the present disclosure, the first and second internal electrodes 111 and 112 may be connected to the lower electrodes 130 through the first and second connection electrodes 121 and 122, respectively, and a short-circuit may be prevented through the insulating spaces S, such that an overlapping area of the first and second internal electrodes 111 and 112 may be increased as much as possible.

Therefore, capacitance of the capacitor may be increased without using an existing method of increasing the numbers of dielectric layers and internal electrodes by reducing thicknesses of the dielectric layers and the internal electrodes. In addition, the same kinds of internal electrodes may be electrically connected to each other through the first and second connection electrodes 121 and 122, such that connectivity of the internal electrodes may be improved even with an ultra-thin product whose body has a thickness of 80 μm or less.

The lower electrodes 130 may be disposed on the lower surface of the body 101, and may be connected to the first and second connection electrodes 121 and 122. The lower electrodes 130 may be provided as regions in which the capacitor component 100 is mounted on a board, or the like, and may have a multilayer structure, if necessary.

The lower electrodes 130 may include electrode layers 131 and 132 connected to the first and second connection electrodes 121 and 122, respectively, and plating layers 133 disposed to cover portions of the electrode layers 131 and 132, respectively.

The electrode layers 131 and 132 may include, respectively, first regions 131a and 132a on which the plating layers 133 are disposed. The electrode layers 131 and 132 may also include, respectively, second regions 131b and 132b respectively connected to the first and second connection electrodes 121 and 122 and respectively extended from the first regions 131a and 132a.

An insulating layer 151 may be disposed between the plating layers 133 to cover the second regions 131b and 132b of the electrode layers 131 and 132 and the first and second connection electrodes 121 and 122.

In a structure of a general capacitor, the first and second connection electrodes are disposed, respectively, at positions close to opposite end surfaces of the body 101 in a length direction thereof. Therefore, electrode layers may be disposed on a surface of the body to connect to the first and second connection electrodes, and plating layers covering the entirety of an upper surface of the electrode layers may be formed.

In such a structure according to the related art, a distance between the first and second connection electrode is excessively large, such that a low equivalent series inductance (ESL) value required in high frequency characteristics may not be obtained.

According to the exemplary embodiment in the present disclosure, as described below, the first and second connection electrodes 121 and 122 may be disposed in a central region of the body 101 such that they have a relatively small distance therebetween. The plating layers 133 may be disposed so as not to cover the entirety of upper surfaces of the respective electrode layers 131 and 132. Instead, the plating layer may be disposed to respectively cover portions of the upper surfaces of the electrode layers 131 and 132.

That is, the electrode layers 131 and 132 may include, respectively, first regions 131*a* and 132*a* on which the plating layers 133 are disposed, and second regions 131*b* and 132*b* connected to the first and second connection electrodes 121 and 122, respectively, and extended from the first regions 131*a* and 132*a*, respectively.

The second regions 131*b* and 132*b* of the electrode layers 131 and 132 may be electrically connected to the first and second connection electrodes 121 and 122, respectively, and the plating layers 133 may be not disposed on the second regions 131*b* and 132*b*.

Since upper portions of the second regions 131*b* and 132*b* are not covered by plating layers 133, a humidity resistance defect such as an electrical short-circuit, or the like, may occur. Therefore, the insulating layer 151 covering the upper portions of the second regions 131*b* and 132*b* may be disposed.

That is, in the capacitor component 100 according to the exemplary embodiment in the present disclosure, the lower electrodes 130 may have a structure in which the electrode layers 131 and 132 additionally have the second regions 131*b* and 132*b* extended from the first regions 131*a* and 132*a*, respectively, in order to electrically connect the first and second connection electrodes 121 and 122 disposed to have a small distance therebetween in order to obtain low ESL characteristics and the lower electrodes 130 to each other, in addition to a structure of the first regions 131*a* and 132*a* of the electrode layers 131 and 132 corresponding to lower electrodes of a capacitor according to the related art and the plating layers 133 disposed on the first regions 131*a* and 132*a*.

As described above, the first and second connection electrodes 121 and 122 are disposed to have the small distance therebetween, such that an ESL value of the capacitor component 100 according to the exemplary embodiment in the present disclosure may be reduced.

While it may be advantageous that the distance between the first and second connection electrodes 121 and 122 is small in order to obtain the low ESL characteristics, an excessively small distance between the first and second connection electrodes 121 and 122 may cause a defect such as a short-circuit due to contact between the first and second connection electrodes 121 and 122 after plating.

According to the exemplary embodiment in the present disclosure, the insulating layer 151 may be disposed between the plating layers 133 to cover the second regions 131*b* and 132*b* of the electrode layers 131 and 132 and the first and second connection electrodes 121 and 122, resulting in prevention of the defect such as the short-circuit due to contact between the first and second connection electrodes 121 and 122.

In detail, the insulating layer 151 may be disposed on a region on which the plating layers 133 are not disposed on the lower surface of the body 101, that is, between the plating layers 133 on the lower surface of the body.

The insulating layer 151 may serve to insulate the first and second connection electrodes 121 and 122 exposed to the lower surface of the body 101 and the second regions 131*b* and 132*b* of the electrodes 131 and 132 externally exposed from each other.

Therefore, the defect such as the short-circuit due to the contact between the first and second connection electrodes 121 and 122 may be prevented, and the humidity resistance defect may also be prevented.

The second regions 131*b* and 132*b* of the electrode layers 131 and 132 connected to the first and second connection electrodes 121 and 122, respectively, may be disposed to cover portions of the first and second connection electrodes 121 and 122, respectively.

Since the first and second connection electrodes 121 and 122 only have to be electrically connected to the lower electrodes 130, the second regions 131*b* and 132*b* of the electrode layers 131 and 132 do not need to cover the entirety of the first and second connection electrodes 121 and 122, and may be disposed to cover portions of the first and second connection electrodes 121 and 122, respectively. Alternatively, the second regions 131*b* and 132*b* of the electrode layers 131 and 132 and the first and second connection electrodes 121 and 122 may be disposed to be in contact with each other, respectively, by a printing method.

According to another exemplary embodiment in the present disclosure, the plating layers 133 may be disposed to cover the entirety of the electrode layers 131 and 132.

Figure 7:
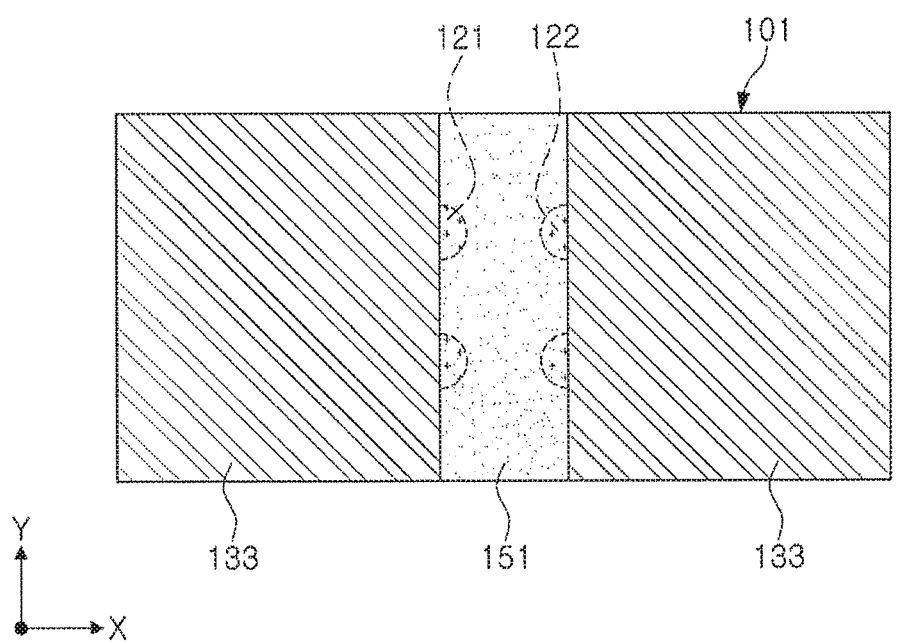
FIG. 7 is a view illustrating example in which forms of plating layers are modified from the exemplary embodiment of FIG. 1.

Referring to FIG. 7, The electrode layers 131 and 132 may additionally have second regions 131*b* and 132*b* extended from the first regions 131*a* and 132*a*, respectively, and the plating layers 133 may be disposed to cover the entirety of the electrode layers 131 and 132, that is, the first regions 131*a* and 132*a* and the second regions 131*b* and 132*b*.

Referring to FIGS. 1 and 2, an insulating layer 151 may be disposed on an upper surface of the body 101.

According to the exemplary embodiment in the present disclosure, the first and second connection electrodes 121 and 122 are disposed to have the small distance therebetween in order to obtain the low ESL characteristics, and a defect such as a short-circuit due to a contact between the first and second connection electrodes 121 and 122 exposed to the upper surface of the body 101 may occur.

According to the exemplary embodiment in the present disclosure, the insulating layer 151 may be disposed on the upper surface of the body 101 to cover the first and second connection electrodes 121 and 122 exposed to the upper surface of the body 101, resulting in prevention of the defect such as the short-circuit due to the contact between the first and second connection electrodes 121 and 122.

The insulating layer 151 may serve to insulate the first and second connection electrodes 121 and 122 exposed to the upper surface of the body 101 from each other.

Therefore, the defect such as the short-circuit due to the contact between the first and second connection electrodes 121 and 122 may be prevented, and the humidity resistance defect may also be prevented.

A cover layer 152 may be between the upper surface of the body 101 and the insulating layer 151 disposed on the upper surface of the body 101. The cover layer may be a dielectric layer and may be formed by adding a green sheet above the upper surface of the body 101.

In the exemplary embodiment in the present disclosure, the distance between the first and second connection electrodes 121 and 122 may be as small as possible in order to obtain a low ESL value, but an insulating state for preventing the defect such as the short-circuit due to the contact between the connection electrodes needs to be necessarily maintained.

In order to prevent defects such as the short-circuit described above, the cover layer 152 may be included between the upper surface of the body 101 and the insulating layer 151 disposed on the upper surface of the body 101, in which can improve the insulating effect for preventing a short-circuit due to contact between the connection electrodes.

Referring to FIG. 3, the number of each of first connection electrodes 121 and second connection electrodes 122 may be one or more. All the first and second connection electrodes 121 and 122 may be disposed in a central portion "c" of the body 101 to be spaced apart from each other by a predetermined distance when the body 101 is trisected in the length direction.

That is, according to the exemplary embodiment in the present disclosure, in order to make the distance between the first and second connection electrodes 121 and 122 as small as possible, all the first and second connection electrodes 121 and 122 may be disposed to be spaced apart from each other by the predetermined distance, and may be disposed within the central portion c of the body 101 when the body 101 is trisected in the length direction.

Due to the structure as described above, the distance between the first and second connection electrodes 121 and 122 may be significantly reduced, such that equivalent series inductance (ESL) and equivalent series resistance (ESR) values may be improved.

The distance "d1" between a first connection electrode 121 and a second connection electrode 122 may be 5 µm or more.

The first connection electrodes 121 and the second connection electrodes 122 are disposed so that the distance d1 therebetween is 5 µm or more, such that the ESL and the ESR values may be improved and reliability may also be secured.

When the distance d1 between the first connection electrode 121 and the second connection electrode 122 is less than 5 µm, the distance between the first and second connection electrodes 121 and 122 may be excessively small, which may lead to a short-circuit due to contact between the first and second connection electrodes 121 and 122, resulting in a reduction in reliability.

When the distance d1 between the first connection electrode 121 and the second connection electrode 122 is excessively large, improvement effect of the ESL and the ESR values may be small.

Figure 4:
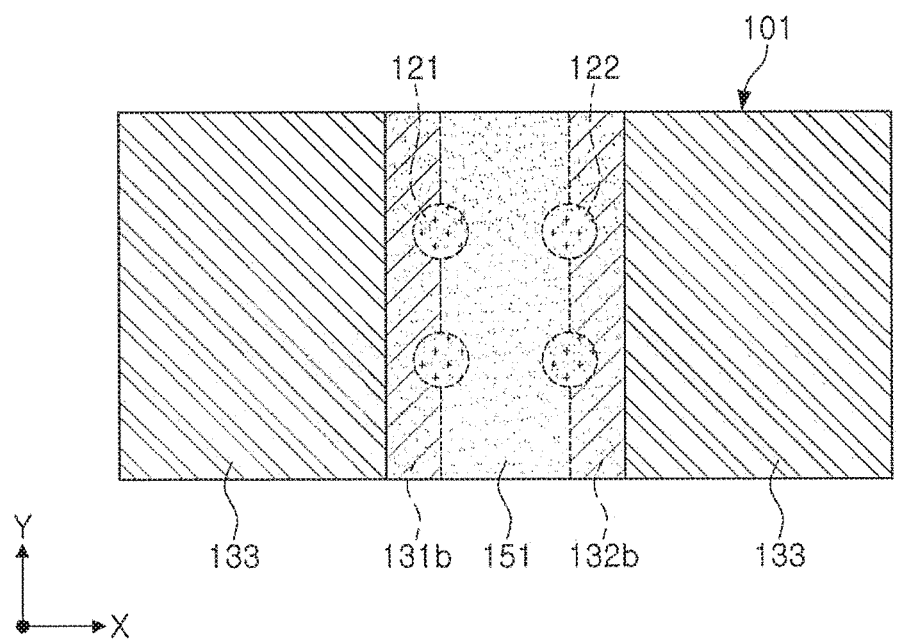
FIGS. 4 through 6 are views illustrating examples in which forms of lower electrodes are modified from the exemplary embodiment of FIG. 1.
Figure 5:
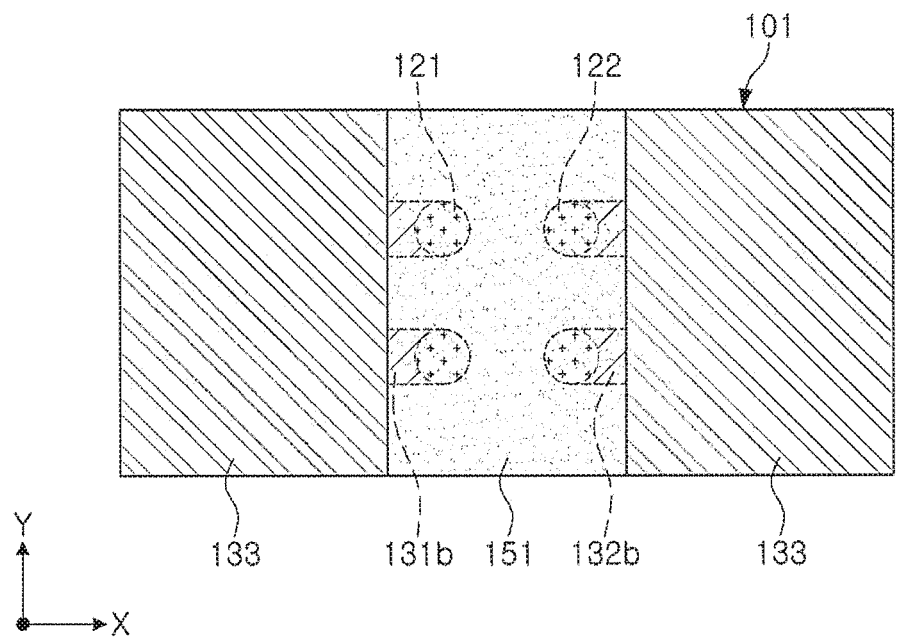
Figure 6:
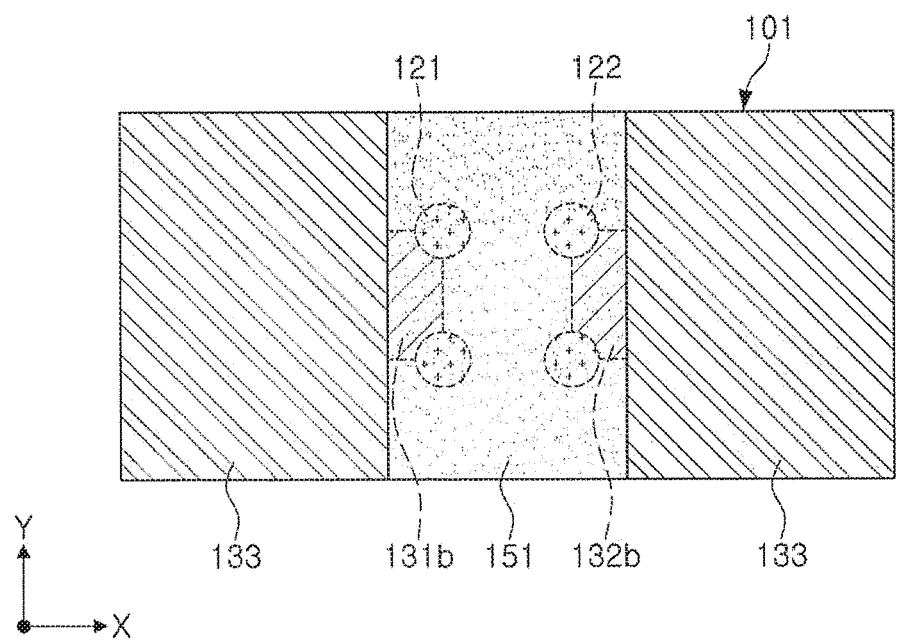

FIGS. 4 through 6 are views illustrating examples in which forms of lower electrodes are modified from an exemplary embodiment of FIG. 1.

Referring to FIG. 4, second regions 131b and 132b of the electrode layers 131 and 132 may be disposed on opposite end portions of the body 101 in a width direction thereof.

The second regions 131b and 132b of the electrode layers 131 and 132 may extend from the first regions 131a and 132a, respectively, and may extend to be electrically connected to the first and second connection electrodes 121 and 122, respectively, in the same shapes as those of the first regions 131a and 132a disposed on the opposite end portions of the body 101 in the width direction thereof.

Therefore, in the exemplary embodiment illustrated in FIG. 4, the second regions 131b and 132b of the electrode layers 131 and 132 may each extend to opposite end portions of the body 101 in the width direction.

According to the present exemplary embodiment, the lower electrode 130 and the first and second connection electrodes 121 and 122 may be easily electrically connected to each other.

Referring to FIG. 5, second regions 131b and 132b of the electrode layers 131 and 132 may be connected to the first and second connection electrodes 121 and 122, respectively, while being provided in an amount equal to the first and second connection electrodes 121 and 122.

That is, the width of portions of the second regions 131b and 132b connected to corresponding first and second connection electrodes 121 and 122 may be the same or approximately the same as the width of the first and second connection electrodes 121 and 122.

That is, unlike other exemplary embodiments, the second regions 131b and 132b of the electrodes 131 and 132 may have only minimum areas for electrical connections with the first and second connection electrodes 121 and 122, and may not be otherwise printed on the lower surface of the body.

Therefore, according to the present exemplary embodiment, the areas of the lower electrodes 130 may not be significantly increased.

Referring to FIG. 6, second regions 131b and 132b of the electrode layers 131 and 132 may be disposed to be spaced apart from opposing end portions of the body 101 in the width direction, and may be in respective shapes that connect the first or second connection electrodes 121 and 122 to each other.

That is, unlike other exemplary embodiments, the second regions 131b and 132b of the electrodes 131 and 132 may have only minimum areas for electrical connections with the first and second connection electrodes 121 and 122, and may have a form in which they are additionally printed in a distance between the first connection electrodes 121 and a distance between the second connection electrodes 122 in the width direction of the body.

Therefore, according to the present exemplary embodiment, the second regions 131b and 132b of the electrodes 131 and 132 and a plurality of first and second connection electrodes 121 and 122 may be easily electrically connected to each other, and the second regions 131b and 132b may be easily formed.

A capacitor component 100 according to another exemplar embodiment in the present disclosure may include a body 101 including a plurality of first and second internal electrodes 111 and 112 alternately stacked with dielectric layers 110 interposed therebetween. First and second connection electrodes 121 and 122 may extend in a thickness direction of the body 101 and connect to the first and second internal electrodes 111 and 112, respectively. Lower electrodes 130 may be disposed on a lower surface of the body 110 and connected to the first and second connection electrodes 121 and 122. The number of each of first connection electrodes 121 and second connection electrodes 122 may be one or more, and all the first and second connection electrodes 121 and 122 may be disposed in a central portion c of the body 101 to be spaced apart from each other by a predetermined distance when the body 101 is trisected in a length direction.

The distance between the first connection electrode 121 and the second connection electrode 122 may be 5 µm or more.

An insulating layer 151 may be disposed on an upper surface of the body 101, and a cover layer 152 may be between the upper surface of the body 101 and the insulating layer 151 disposed on the upper surface of the body 101.

The lower electrodes 130 may include electrode layers 131 and 132 connected to the first and second connection electrodes 121 and 122, respectively, and plating layers 133 disposed to cover portions of the electrode layers 131 and 132. The electrode layers 131 and 132 may include, respectively, first regions 131a and 132a on which the plating layers 133 are disposed, and second regions 131b and 132b connected to the first and second connection electrodes 121 and 122, respectively, and extended from the first regions 131a and 132a, respectively. An insulating layer 151 may be disposed between the plating layers 133 to cover the second regions 131b and 132b of the electrode layers 131 and 132 and the first and second connection electrodes 121 and 122.

The second regions 131b and 132b of the electrode layers 131 and 132 may be extend to opposing end portions of the body 101 in a width direction.

The second regions 131b and 132b of the electrode layers 131 and 132 may be connected to the first and second connection electrodes 121 and 122, respectively, while being provided in an amount equal to the first and second connection electrodes 121 and 122.

The second regions 131b and 132b of the electrode layers 131 and 132 may be disposed to be spaced apart from opposing end portions of the body 101 in the width direction thereof, and may be in shapes connecting the first connection electrodes 121 to each other and connecting the second connection electrodes 122 to each other.

An overlapping description for the same contents as those of the capacitor component according to the exemplary embodiment in the present disclosure described above among other features of the capacitor component according to another exemplary embodiment in the present disclosure have been omitted.

As set forth above, according to the exemplary embodiments in the present disclosure, the ESL and ESR values may be improved by changing positions and the number of connection electrodes.

While exemplary embodiments have been shown and described above, it will be apparent to those skilled in the art that modifications and variations could be made without departing from the scope of the present invention as defined by the appended claims.

What is claimed is:

1. A capacitor component comprising:
a body including a plurality of first and second internal electrodes alternately stacked in a thickness direction with dielectric layers interposed therebetween;
first and second connection electrodes extended in the thickness direction and respectively connected to the first and second internal electrodes; and
first and second lower electrodes on a lower surface of the body in the thickness direction and respectively connected to the first and second connection electrodes,
wherein the first and second lower electrodes respectively include first and second electrode layers respectively connected to the first and second connection electrodes, and first and second plating layers respectively covering portions of the first and second electrode layers,
the first and second electrode layers each include a first region covered by the plating layer, and a second region connected to the connection electrode, not covered by the plating layer, and extended from the first region, and
an insulating layer between the first and second plating layers and covering the respective second regions of the first and second electrode layers and the first and second connection electrodes.

2. The capacitor component of claim 1, wherein there are one or more first connection electrodes and one or more second connection electrodes, and all the first and second connection electrodes are in a central portion of the body, when the body is trisected equally in a length direction perpendicular to the thickness direction, and spaced apart from each other by a predetermined distance.

3. The capacitor component of claim 2, wherein a minimum distance between any one of the first connection electrodes and any one of the second connection electrodes is 5 μm or more.

4. The capacitor component of claim 1, further comprising an upper insulating layer disposed on an upper surface of the body in the thickness direction.

5. The capacitor component of claim 4, further comprising a green sheet cover layer between the upper surface of the body and the upper insulating layer.

6. The capacitor component of claim 1, wherein the second regions of the first and second electrode layers each extend to opposing end portions of the body in a width direction perpendicular to the thickness direction.

7. The capacitor component of claim 1, wherein the second regions of the first and second electrode layers are respectively connected to the first and second connection electrodes and each have a width equal to that of the first and second connection electrodes.

8. The capacitor component of claim 1, wherein the second regions of the first and second electrode layers are spaced apart from opposing end portions of the body in a width direction perpendicular to the thickness direction, and are each in a shape connecting their respective connection electrodes to each other.

9. A capacitor component comprising:
a body including a plurality of first and second internal electrodes alternately stacked in a thickness direction with dielectric layers interposed therebetween;
first and second connection electrodes extended in the thickness direction and respectively having a side surface directly connected to the first and second internal electrodes; and
first and second lower electrodes on a lower surface of the body in the thickness direction and respectively connected to the first and second connection electrodes,
wherein there are one or more first connection electrodes and one or more second connection electrodes, and all the first and second connection electrodes are in a central portion of the body, when the body is trisected equally in a length direction perpendicular to the thickness direction, and spaced apart from each other by a distance smaller than a length of each of the equally trisected portions.

10. The capacitor component of claim 9, wherein a minimum distance between any one of the first connection electrodes and any one of the second connection electrodes is 5 μm or more.

11. The capacitor component of claim 9, further comprising an upper insulating layer on an upper surface of the body in the thickness direction.

12. The capacitor component of claim 11, further comprising a green sheet cover layer between the upper surface of the body and the upper insulating layer.

13. The capacitor component of claim 9, wherein the first and second lower electrodes respectively include first and second electrode layers respectively connected to the first and second connection electrodes, and first and second plating layers respectively covering portions of the first and second electrode layers,
the first and second electrode layers each include a first region covered by the plating layer, and a second region connected to the one or more connection electrodes, not covered by the plating layer, and extended from the first region, and
an insulating layer between the first and second plating layers and covering the respective second regions of the first and second electrode layers and the first and second connection electrodes.

14. The capacitor component of claim 13, wherein the second regions of the first and second electrode layers each extend to opposing end portions of the body in a width direction perpendicular to the thickness direction.

15. The capacitor component of claim 13, wherein the second regions of the first and second electrode layers are respectively connected to the first and second connection electrodes and each have a width equal to that of the first and second connection electrodes.

16. The capacitor component of claim 13, wherein the second regions of the first and second electrode layers are spaced apart from opposing end portions of the body in a width direction perpendicular to the thickness direction, and are each in a shape connecting their respective connection electrodes to each other.

17. A capacitor component comprising:
 a body including a plurality of first and second internal electrodes alternately stacked in a thickness direction with dielectric layers interposed therebetween;
 a first connection electrode extended in the thickness direction, having a side surface directly connected to the first internal electrodes, and spaced apart from the second internal electrodes;
 a second connection electrode extended in the thickness direction, having a side surface directly connected to the second internal electrodes, and spaced apart from the first internal electrodes;
 a first electrode layer on a lower surface of the body in the thickness direction, extending from a first end surface, in a length direction perpendicular to the thickness direction, toward the center of the body in the thickness direction, and in contact with the first connection electrode;
 a second electrode layer on the lower surface of the body in the thickness direction, extending from a second end surface, opposing the first end surface in the length direction, toward the center of the body in the thickness direction, spaced apart from the first electrode layer, and in contact with the second connection electrode;
 a lower insulating layer on the lower surface of the body and between the first and second electrode layers, extending over a portion of the first electrode layer, and extending over a portion of the second electrode layer,
 wherein the first and second connection electrodes are in a central portion of the body, when the body is trisected equally in the length direction, and spaced apart from each other by a distance smaller than a length of each of the equally trisected portions.

18. The capacitor component of claim 17, further comprising:
 a first plating, layer covering a portion of the first electrode layer; and
 a second plating layer, covering a portion of the second electrode layer.

19. The capacitor component of claim 17, further comprising:
 an upper cover layer comprising a dielectric layer on the upper surface of the body opposing the lower surface of the body in the thickness direction; and
 an upper insulating layer over the upper cover layer.

20. The capacitor component of claim 17, wherein:
 the first electrode layer includes a first region extending to the first end surface and to opposing side surfaces in a width direction perpendicular to the thickness direction and perpendicular to the length direction, and a second region extending from the first region, spaced apart from the opposing side surfaces, and in contact with the first connection electrode, and
 the second electrode layer includes a first region extending to the second end surface and to the opposing side surfaces, and a second region extending from the first region, spaced apart from the opposing side surfaces, and in contact with the second connection electrode.

* * * * *